(12) United States Patent
Pumputis et al.

(10) Patent No.: US 12,058,997 B2
(45) Date of Patent: Aug. 13, 2024

(54) COMPOSITIONS FOR TRANSPORTATION AND/OR CRYOPRESERVATION OF CELLS AND/OR TISSUES

(71) Applicant: ACORN BIOLABS, INC., Toronto (CA)

(72) Inventors: Patrick G. Pumputis, London (CA); Steven ten Holder, Ottawa (CA); Drew W. Taylor, Toronto (CA)

(73) Assignee: ACORN BIOLABS, INC., Toronto (CA)

( * ) Notice: Subject to any disclaimer, the term of this patent is extended or adjusted under 35 U.S.C. 154(b) by 0 days.

(21) Appl. No.: 17/264,602

(22) PCT Filed: Jul. 26, 2019

(86) PCT No.: PCT/CA2019/051036
§ 371 (c)(1),
(2) Date: Jan. 29, 2021

(87) PCT Pub. No.: WO2020/024045
PCT Pub. Date: Feb. 6, 2020

(65) Prior Publication Data
US 2021/0289770 A1    Sep. 23, 2021

Related U.S. Application Data

(60) Provisional application No. 62/711,808, filed on Jul. 30, 2018.

(51) Int. Cl.
*C12N 5/00*        (2006.01)
*A01N 1/02*        (2006.01)

(52) U.S. Cl.
CPC ................................. *A01N 1/0226* (2013.01)

(58) Field of Classification Search
CPC ...................................................... C12N 5/0018
See application file for complete search history.

(56) References Cited

U.S. PATENT DOCUMENTS

| 5,405,742 A | 4/1995 | Taylor |
| 6,045,990 A | 4/2000 | Baust et al. |

(Continued)

FOREIGN PATENT DOCUMENTS

| CN | 109511649 A | 3/2019 |
| CN | 109511650 A | 3/2019 |

(Continued)

OTHER PUBLICATIONS

Dou, W. et al. Protective Effect of Naringenin Against Experimental Colitis via Suppression of Toll-Like Receptor 4/NF-kappa B Signalling. British J of Nutrition 110(4)599-608, Mar. 2013 (Year: 2013).*

(Continued)

*Primary Examiner* — Rosanne Kosson
(74) *Attorney, Agent, or Firm* — Alston & Bird LLP

(57) ABSTRACT

In various aspects, there are provided compositions used for the transportation and/or cryopreservation of cells, tissues or organs. The transportation and/or cryopreservation compositions comprise at least naringenin, a buffering system and a sugar component. In some embodiments, the cells, tissues or organs are human hair follicles, cells derived from human hair follicles or cells derived from urine.

17 Claims, 6 Drawing Sheets

(56) References Cited

U.S. PATENT DOCUMENTS

| | | | | |
|---|---|---|---|---|
| 2014/0030231 | A1* | 1/2014 | Yarmush | G01N 33/5091 424/93.7 |
| 2018/0070582 | A1* | 3/2018 | Doorschodt | C08L 71/08 |
| 2019/0203240 | A1* | 7/2019 | Rabausch | C12P 13/06 |

FOREIGN PATENT DOCUMENTS

| | | |
|---|---|---|
| EP | 2175718 B1 | 2/2013 |
| JP | 2012-249556 A | 12/2012 |
| WO | WO-2014/162910 A1 | 10/2014 |
| WO | WO-2017/121863 A1 | 7/2017 |

OTHER PUBLICATIONS

Nascimento G. et al. The Acute Effects of Citrus Flavanones on the Metabolism of Glyogen and Monosaccharides in the Isolated Perfused Rat Liver. Toxicology Letters 291:158-172, Apr. 2018. (Year: 2018).*

Himedia, DMEM Product Information, HiMedia Cell Culture, https://us.vwr.com/assetsvc/asset/en_US/id/8040925/contents, 2011.*

Extended European Search Report for European patent application No. 19844065.3, dated Apr. 4, 2022, (8 pages), European Patent Office, Munich, Germany.

DaPozzo, Eleonara et al. "The Citrus Flavanone Naringenin Protects Myocardial Cells Against Age-Associated Damage," *Hindawi—Oxidative Medicine and Cellular Longevity*, vol. 2017, Article ID 9536148, (12 pages), DOI: 10.1155/2017/9536148.

International Searching Authority, International Search Report and Written Opinion for International Application No. PCT/CA2019/051036, Oct. 3, 2019, (9 pages), Canadian Intellectual Property Office, Quebec, Canada.

Boyce, Steven T. et al. *Calcium-Regulated Differentiation Of Normal Human Epidermal Keratinocytes In Chemically Defined Clonal Culture and Serum-Free Serial Culture*, Journal of Investigative Dermatology, vol. 81, No. 1 Supplement, Jul. 1, 1983, pp. 33s-40s.

Stumvoll, Michael et al. *Role Of Glutamine In Human Carbohydrate Metabolism In Kidney And Other Tissues*, Kidney International, vol. 55, Issue 3, Mar. 1999, pp. 778-792.

Peus, Dominik et al. *Vitamin E Analog Modulates UVB-Induced Signaling Pathway Activation And Enhances Cell Survival*. Free Radical Biology and Medicine, vol. 30, No. 4, Feb. 15, 2001, pp. 425-432. DOI: 10.1016/s0891-5849(00)00488-3.

Frabasile, Sandra et al. *The Citrus Flavanone Naringenin Impairs Dengue Virus Replication In Human Cells*, Scientific Reports, Feb. 3, 2017, vol. 7, No. 41864, pp. 1-10. DOI: 10.1038/srep43976.

Menanteau-Ledouble, S. et al. *Effect Of A Phytogenic Feed Additive On The Susceptibility Of Onchorhynchus Mykiss To Aeromonas Salmonicida*, Diseases Of Aquatic Organisms, vol. 115, Jun. 29, 2015, pp. 57-66. DOI: 10.3354/dao02875.

Madaan, Alka et al. *In Vitro Hair Growth Promoting Effects Of Naringenin And Hesperetin On Human Dermal Papilla Cells And Keratinocytes*, American Journal Of Dermatology and Venereology, vol. 6, No. 3, Jun. 2017, pp. 51-57. DOI: 10.5923/j.ajdv.20170603. 02.

Noda, Sakino et al. *Naringenin Enhances Intestinal Barrier Function Through The Expression And Cytoskeletal Association Of Tight Junction Proteins In Caco-2 Cells*, Molecular Nutrition & Food Research, vol. 57, Issue 11, Nov. 2013, pp. 2019-2028. DOI: 10.1002/mnfr.201300045. Epub: Jul. 19, 2013.

Jobeili, Lara et al. *Selenium Preserves Keratinocyte Stemness And Delays Senescence By Maintaining Epidermal Adhesion*, Aging (Albany NY), vol. 9, No. 11, Nov. 2017, pp. 2302-2315. DOI: 10.18632/aging.101322.

Kopeika, Julia et al. *The Effect Of Cryopreservation On The Genome Of Gametes And Embryos: Principles Of Cryobiology And Critical Appraisal Of The Evidence*, Human Reproduction Update, vol. 21, No. 2, Dec. 17, 2014, pp. 209-227. DOI:10.1093/humupd/dmu063.

Gao, Doyong et al. *Mechanisms of Cryoinjury in Living Cells*, ILAR Journal, vol. 41, Issue 4, (2000), pp. 187-196. DOI: 10.1096/ilar. 41.4.187.

Chaytor, Jennifer L. et al. *Inhibiting Ice Recrystallization And Optimization Of Cell Viability After Cryopreservation*, Glycobiology, vol. 22, No. 1, (2012), pp. 123-133. DOI: 10.1093/glycob/cwr115.

Mistriotis, Panagiotis et al. *Hair Follicle: A Novel Source Of Multipotent Stem Cells For Tissue Engineering And Regenerative Medicine*, Tissue Engineering: Part B, vol. 19, No. 4, (2013), pp. 265-278. DOI: 10.1089/ten.teb.2012.0422.

Gho, C.G. et al. *Human Follicular Stem Cells: Their Presence In Plucked Hair And Follicular Cell Culture*, British Journal Of Dermatology, vol. 150, (2004), pp. 860-868. DOI: 10.1111/j.0007-0963.2004.05862.x.

Ansell, David M. et al. *Exploring The "Hair Growth-Wound Healing Connection": Anagen Phase Promotes Wound Re-Epithelialization*, Journal of Investigative Dermatology, vol. 131, (2011), pp. 518-528. DOI: 10.1038/jid.2010.291.

Aasen, Trond et al. *Isolation And Cultivation Of Human Keratinocytes From Skin Or Plucked Hair For The Generation Of Induced Pluripotent Stem Cells*, Nature Protocol, vol. 5, No. 2, (2010), pp. 371-382. DOI: 10.1038/nprot.2009.241.

Petit, I. et al. *Induced Pluripotent Stem Cells From Hair Follicles As A Cellular Model For Neurodevelopmental Disorders*, Stem Cell Research, vol. 8, (2012), pp. 134-140. DOI: 10.1016/j.scr.2011.09. 003.

Bharadwaj, Shantaram et al. *Multipotential Differentiation of Human Urine-Derived Stem Cells: Potential for Therapeutic Applications in Urology*, Stem Cells, vol. 31, Issue 9, (2013), pp. 1840-1856. DOI: 10.1002/stem.1424.

Qin, Danian et al. *Urine-Derived Stem Cells For Potential Use In Bladder Repair*, Stem Cell Research & Therapy, vol. 5, No. 69, May 2014, pp. 1-10. DOI: 10.1186/scrt458.

Zhou, Ting et al. *Generation Of Human Induced Pluripotent Stem Cells From Urine Samples*, Nature Protocols, vol. 7, No. 12, (2012), pp. 2080-2089. DOI: 10.1038/nprot.2012.115.

Hung, Sandy S.C. et al. *Generation Of Integration-Free Human Induced Pluripotent Stem Cells Using Hair-Derived Keratinocytes*, Journal of Visualized Experiments, vol. 102, Aug. 20, 2015, pp. 1-6. DOI: 10.3791/53174. e53174.

Salehi, Bahare et al. *The Therapeutic Potential of Naringenin: A Review of Clinical Trials*, Pharmaceuticals, vol. 12, No. 1, Jan. 10, 2019, pp. 1-18. DOI: 10.3390/ph12010011.

Indian Examination Report for Indian Patent Application No. 202147007948, dated Aug. 23, 2022, (7 pages), Intellectual Property of India, Mumbia, India.

Notice of Reason For Refual for Japanese Patent Application No. 2021-529495, dated Jun. 20, 2023, (5 pages), Japan Patent Office, Tokyo, Japan.

* cited by examiner

COMPOSITIONS FOR TRANSPORTATION AND/OR CRYOPRESERVATION OF CELLS AND/OR TISSUES

CROSS REFERENCE TO RELATED APPLICATIONS

This application is a National Stage Application, filed under 35 U.S.C. § 371, of International Application No. PCT/CA2019/051036, filed Jul. 26, 2019; which international application claims priority to and the benefit of U.S. Provisional Application No. 62/711,808, filed Jul. 30, 2018 and entitled "COMPOSITIONS FOR TRANSPORTATION AND/OR CRYOPRESERVATION OF CELLS AND/OR TISSUES;" the contents of both of which as is hereby incorporated herein by reference in their entireties.

BACKGROUND

Related Field

The specification relates generally to compositions for the transportation and/or cryopreservation of live cells, tissues and organs. In particular, the specification relates to compositions comprising naringenin, a buffering system and a sugar component that are used for the transportation and/or cryopreservation of live human and animal cells, tissues and organs collected from non-invasive sources.

Description of Related Art

Many compositions currently exist for the transportation and cryopreservation of cells, tissues and organs. For example, the transportation and storage of live cells, tissues and organs have been carried out at hypothermic temperatures of, for example, 4-8° C. in liquid compositions formulated to maintain osmotic balance, minimize temperature stress, and reduce apoptosis and/or necrotic cell death during transport. Prior art examples of compositions used for the hypothermic storage of cells include HypoThermosol™, AQIX™, and Viaspan™. While these, and other, prior art compositions may have been effectively used as a storage media for many different cell, tissue and organ types, these compositions are not optimized for transportation, especially by mail or postal services. Transportation challenges may include, among other things: fluctuations in temperature, exposure to extreme temperature ranges, jostling and vibrations, delays in mail, postal and courier delivery; delays in import/export; delays in customs; and logistical challenges (e.g. delivery to remote locations). Cells, tissues and organs retrieved from non-invasive sources, such as hair follicles, cells derived from hair follicles and urine derived cells, are affected by such transportation challenges. These transportation challenges often result in sub-optimal cell viability, particularly following transport over periods of time greater than 24 hours. Often, transportation will compromise or undermine the suitability of the cells, tissues and organs for cryopreservation, transplantation and/or therapeutic use. In particular, prior art compositions are not intended to be used with small cells and tissues, especially hair follicles. Additionally, the initial Hypothermosol™ (U.S. Ser. No. 00/540, 5742A and U.S. Ser. No. 00/604,5990A) and AQIX™ (EP2175718B1) patented compositions were intended for use as a hypothermic blood substitute to minimize hypovolemia and reperfusion injury including uses in intravenous and extravascular infusion procedures.

Cells, tissues and organs may be transported for cryopreservation. Cryopreservation is the application of extremely low temperatures, as low as −196° C. with for example liquid nitrogen, to store cells, tissues, and organs in a biologically inactive state, to preserve them for future use. In the prior art, liquid compositions that protect cells from freezing have been used to store cells, tissues, and organs at these low temperatures. Many variations of these cryopreservation compositions exist in the prior art, and many contain cryoprotectants for shielding the biological constructs of cells against ice crystal damage. In addition, cryopreservation solutions of the prior art also contain components such as apoptotic regulators that help biological materials recover from thawing. Examples of cryopreservation solutions in the prior art include, CryoStor™, CELLBANKER™, Syth-a-Freeze™ and mFreSR™

Despite the ability of CryoStor™, CELLBANKER™, Syth-a-Freeze™ and mFreSR™ to viably cryopreserve cells, tissues and organs, the currently available compositions have not been optimized for the cryopreservation of cells, tissues and organs retrieved from non-invasive cells sources, such as hair follicles, cells derived from hair follicles and urine derived cells. The currently available compositions yield sub-optimal post thaw viability especially if the cells, tissues and organs experienced transport for more than 24 hours by mail or postal services prior to cryopreservation.

In addition to the above, compositions used for the transportation and cryopreservation of cells, tissues and organs in the prior art often contain chemically undefined serum and/or animal components as a source of critical nutrients like lipids, vitamins, hormones and trace elements. It has been reported that the risks associated with the use of chemically undefined serum and/or animal components in such compositions include pathogen contamination and batch variability. Moreover if the cells, tissues and organs contained in such compositions are to be used in humans, immune response or rejection can occur, rendering the cells, tissues and organs therapeutically unusable and potentially causing damage to the human recipient. Reducing the presence of chemically undefined serum and/or animal components in transportation and cryopreservation compositions is important to help maintain the therapeutic and clinical relevance of the cells, tissues and organs.

Additionally, it is common for prior art transportation and cryopreservation compositions to contain 10% (v/v) dimethyl sulfoxide ("DMSO") as a cryoprotectant. While DMSO is an effective cryoprotectant, it is also known to be toxic to cells, tissues and organs at such concentrations. Reducing the amount of DMSO used in transportation and cryopreservation compositions may help reduce toxicity and avoid comprising the cells, tissues and organs. Furthermore, reducing the amount of DMSO in these compositions may help avoid undermining the suitability of these cells, tissues and organs for transplantation and/or therapeutic use.

BRIEF SUMMARY

In various aspects, embodiments relate to a composition comprising naringenin, a buffering system and a sugar component, wherein the composition is used for the transportation of cells, tissues or organs. In some embodiments, the cells, tissues or organs are human hair follicles, cells derived from human hair follicles or cells derived from urine.

According to some embodiments, the concentration of naringenin in the transportation composition is about 0.01

μM to about 10 μM. According to other embodiments, the concentration of naringenin in the transportation composition is about 0.01 μM to about 0.25 μM.

According to some embodiments, the buffering system of the transportation composition comprises: about 15 mM to about 45 mM of a synthetic biological buffer; about 2 mM to about 20 mM of hydrogen bicarbonate; about 6 mM to about 25 mM of hydrogen phosphate; or a combination thereof. According to other embodiments, the buffering system of the transportation composition comprises: about 15 mM to about 45 mM of a synthetic biological buffer; about 3 mM to about 9 mM of hydrogen bicarbonate; about 10 mM to about 15 mM of hydrogen phosphate; or a combination thereof.

According to some embodiments, the sugar component of the transportation composition comprises about 2 mM to about 25 mM of D-glucose. According to other embodiments, the sugar component of the transportation composition comprises about 9 mM to about 15 mM of D-glucose.

According to some embodiments, the transportation composition further comprises: about 20 mM to about 120 mM of sodium ions; about 0.01 mM to about 1 mM of calcium ions; about 10 mM to about 70 mM of chloride ions; about 2 mM to about 12 mM of potassium ions; about 0.1 mM to about 1 mM of magnesium ions; about 0.2 mM to about 10 mM of alanyl-glutamine; about 0.01 μM to about 10 μM of (+)-6-hydroxy-2,5,7,8-tetramethylchromane-2-carboxylic acid;

or a combination thereof. According to some embodiments, the transportation composition comprises: about 70 mM to about 90 mM of sodium ions; about 0.03 mM to about 1 mM of calcium ions; about 40 mM to about 60 mM of chloride ions; about 2 mM to about 5 mM of potassium ions; about 0.4 mM to about 0.7 mM of magnesium ions; about 1 mM to about 5 mM of alanyl-glutamine; about 0.05 μM to about 0.25 μM of (+)-6-hydroxy-2,5,7,8-tetramethylchromane-2-carboxylic acid; or a combination thereof.

According to some embodiments, the transportation composition further comprises: about 0.1 μg/mL to about 20 μg/mL of insulin; about 1 μg/mL to about 20 μg/mL of transferrin; about 5 nM to about 50 nM of sodium selenite; or a combination thereof. According to some embodiments, the transportation composition comprises: about 8 μg/mL to about 12 μg/mL of insulin; about 3 μg/mL to about 7 μg/mL of transferrin; about 20 nM to about 40 nM of sodium selenite; or a combination thereof.

According to some embodiments, the transportation composition further comprises: about 10 units/mL to about 200 units/mL of penicillin; about 0.01 mg/mL to about 1 mg/ml of streptomycin; or a combination thereof. According to some embodiments, the transportation composition comprises: about 80 units/mL to about 120 units/mL of penicillin; about 0.08 mg/mL to about 0.2 mg/mL of streptomycin; or a combination thereof.

In one aspect, the transportation composition comprises: about 0.01 μM to about 0.25 μM of naringenin; about 15 mM to about 45 mM of a synthetic biological buffer; about 3 mM to about 9 mM of hydrogen bicarbonate; about 10 mM to about 15 mM of hydrogen phosphate; about 9 mM to about 15 mM of D-glucose; about 70 mM to about 90 mM of sodium ions; about 0.03 mM to about 1 mM of calcium ions; about 40 mM to about 60 mM of chloride ions; about 2 mM to about 5 mM of potassium ions; about 0.4 mM to about 0.7 mM of magnesium ions; about 1 mM to about 5 mM of alanyl-glutamine; and about 0.05 μM to about 0.25 μM of (+)-6-hydroxy-2,5,7,8-tetramethylchromane-2-carboxylic acid.

In some embodiments, the transportation composition may be used for the transportation of cells, tissues and organs before the cells, tissues or organs are cryopreserved.

In various aspects, embodiments relate to a composition comprising naringenin, a buffering system and a sugar component, wherein the composition is used for the cryopreservation of cells, tissues or organs. In some embodiments, the cells, tissues or organs are human hair follicles, cells derived from human hair follicles or cells derived from urine.

According to some embodiments, the concentration of naringenin in the cryopreservation composition is about 0.01 μM to about 10 μM. According to other embodiments, the concentration of naringenin in the cryopreservation composition is about 0.01 μM to about 0.25 μM.

According to some embodiments, the buffering system of the cryopreservation composition comprises: about 15 mM to about 45 mM of a synthetic biological buffer; about 2 mM to about 20 mM of hydrogen bicarbonate; about 6 mM to about 25 mM of hydrogen phosphate; or a combination thereof. According to other embodiments, the buffering system of the cryopreservation composition comprises: about 15 mM to about 45 mM of a synthetic biological buffer; about 3 mM to about 9 mM of hydrogen bicarbonate; about 10 mM to about 15 mM of hydrogen phosphate; or a combination thereof.

According to some embodiments, the sugar component of the cryopreservation composition comprises about 2 mM to about 25 mM of D-glucose. According to other embodiments, the sugar component of the cryopreservation composition comprises about 9 mM to about 15 mM of D-glucose.

According to some embodiments, the cryopreservation composition further comprises: about 20 mM to about 120 mM of sodium ions; about 0.01 mM to about 1 mM of calcium ions; about 10 mM to about 70 mM of chloride ions; about 2 mM to about 12 mM of potassium ions; about 0.1 mM to about 1 mM of magnesium ions; about 0.2 mM to about 10 mM of alanyl-glutamine; about 0.01 μM to about 10 μM of (+)-6-hydroxy-2,5,7,8-tetramethylchromane-2-carboxylic acid; or a combination thereof. According to some embodiments, the cryopreservation composition comprises: about 70 mM to about 90 mM of sodium ions; about 0.03 mM to about 1 mM of calcium ions; about 40 mM to about 60 mM of chloride ions; about 2 mM to about 5 mM of potassium ions; about 0.4 mM to about 0.7 mM of magnesium ions; about 1 mM to about 5 mM of alanyl-glutamine; about 0.05 μM to about 0.25 μM of (+)-6-hydroxy-2,5,7,8-tetramethylchromane-2-carboxylic acid; or a combination thereof.

According to some embodiments, the cryopreservation composition further comprises: about 0.1 μg/mL to about 20 μg/mL of insulin; about 1 μg/mL to about 20 μg/mL of transferrin; about 5 nM to about 50 nM of sodium selenite; or a combination thereof. According to some embodiments, the cryopreservation composition comprises: about 8 μg/mL to about 12 μg/mL of insulin; about 3 μg/mL to about 7 μg/mL of transferrin; about 20 nM to about 40 nM of sodium selenite; or a combination thereof.

According to some embodiments, the cryopreservation composition further comprises: about 10 units/mL to about 200 units/mL of penicillin; about 0.01 mg/mL to about 1 mg/mL of streptomycin; or a combination thereof. According to some embodiments, the cryopreservation composition comprises: about 80 units/mL to about 120 units/mL of penicillin; about 0.08 mg/mL to about 0.2 mg/mL of streptomycin; or a combination thereof.

According to some embodiments, the cryopreservation composition further comprises: about 0.001 g/mL to about 0.2 g/mL of dextran 40; about 10 mM to about 60 mM of sucrose; about 0.1% (v/v) to about 20% (v/v) of dimethylsulfoxide; or a combination thereof. According to some embodiments, the cryopreservation composition comprises: about 0.03 g/mL to about 0.07 g/m of dextran 40; about 20 mM to 40 mM of sucrose; about 2.5% (v/v) to about 10% (v/v) of dimethylsulfoxide; or a combination thereof.

In one aspect, the cryopreservation composition comprises: about 0.01 µM to about 0.25 µM of naringenin; about 15 mM to about 45 mM of a synthetic biological buffer; about 3 mM to about 9 mM of hydrogen bicarbonate; about 10 mM to about 15 mM of hydrogen phosphate; about 9 mM to about 15 mM of D-glucose; about 70 mM to about 90 mM of sodium ions; about 0.03 mM to about 1 mM of calcium ions; about 40 mM to about 60 mM of chloride ions; about 2 mM to about 5 mM of potassium ions; about 0.4 mM to about 0.7 mM of magnesium ions; about 1 mM to about 5 mM of alanyl-glutamine; about 0.05 µM to about 0.25 µM of (+)-6-hydroxy-2,5,7,8-tetramethylchromane-2-carboxylic acid; about 0.03 g/mL to about 0.07 g/m of dextran 40; about 20 mM to 40 mM of sucrose; and less than about 5% (v/v) of dimethylsulfoxide.

In some embodiments, the cryopreservation composition may be used for the cryopreservation of cells, tissues and organs after the cells, tissues or organs have been transported.

BRIEF DESCRIPTION OF THE FIGURES

For a better understanding of the various implementations described herein and to show more clearly how they may be carried into effect, reference will now be made, by way of example only, to the accompanying drawings in which.

DETAILED DESCRIPTION OF VARIOUS EMBODIMENTS

Figure 1:
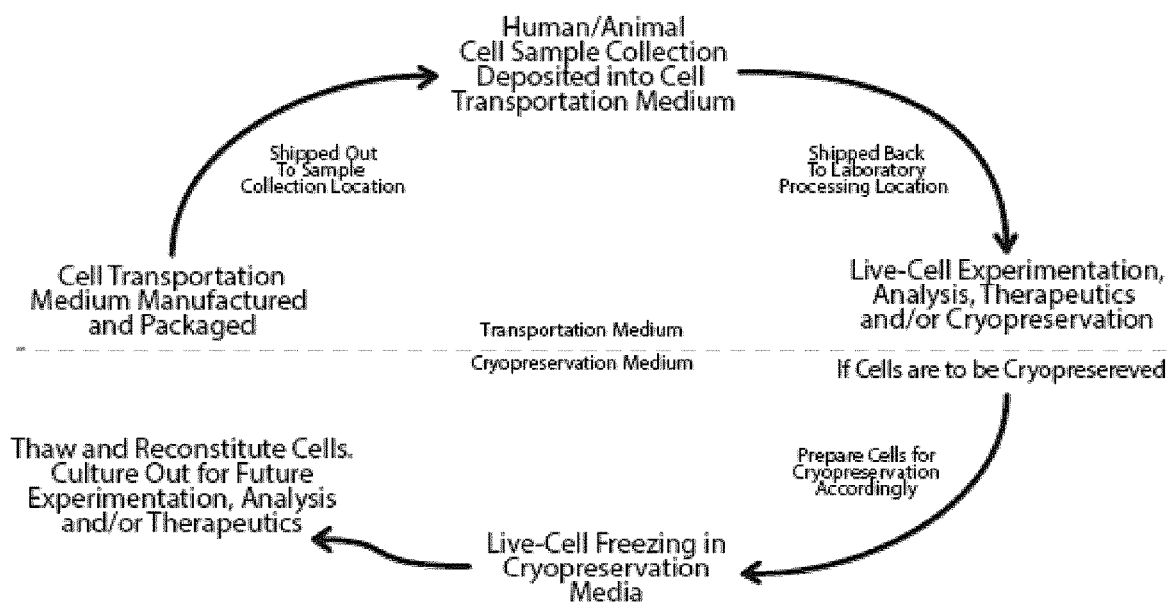
FIG. 1 depicts a flow chart illustrating an example of a pipeline that may be used to transport and cryopreserve cells, tissues and organs in accordance with non-limiting embodiments.

The description that follows, and the embodiments described therein, is provided by way of illustration of an example, or examples, of particular embodiments of the principles and aspects of the present invention. These examples are provided for the purposes of explanation, and not of limitation, of those principles and of the invention. Unless defined otherwise, all terms and phrases used herein include the meanings that the terms and phrases have attained in the art, unless the contrary is clearly indicated or clearly apparent from the context in which the term or phrase is used.

As used herein, a person skilled in the relevant art may generally understand the term "comprising" to mean the presence of the stated features, components or groups as referred to in the claims, but that it does not preclude the presence or addition of one or more other features, components or groups thereof.

As used herein, a person skilled in the relevant art may generally understand the term "transportation" to mean the movement of goods, such as organelles, cells, tissues, extracellular matrix, organs or other biological constructs susceptible to damage caused by unregulated chemical kinetics, from one location to another. The term "transportation" as it is used herein may also include the short-term storage of goods, such as organelles, cells, tissues, extracellular matrix, organs or other biological constructs susceptible to damage caused by unregulated chemical kinetics. Transportation may include transportation by mail. Many challenges may be faced during transportation, which include, among other things: fluctuations in temperature, exposure to extreme temperature ranges, jostling and vibrations, delays in mail, postal and courier delivery; delays in import/export; delays in customs; and logistical challenges (e.g. delivery to remote locations). According to some embodiments, there are provided compositions that may be used for the transportation of cells, tissues and organs. The term "transportation composition" may, but need not necessarily, be used herein to refer to such compositions.

As used herein, a person skilled in the relevant art may generally understand the term "cryopreservation" to mean a process wherein organelles, cells, tissues, extracellular matrix, organs or other living biological constructs susceptible to damage caused by unregulated chemical kinetics are preserved by cooling to very low temperatures (typically −80° ° C. using solid carbon dioxide or −196° ° C. using liquid nitrogen). According to some embodiments, there are provided compositions that may be used for the cryopreservation of cells, tissues and organs. The term "cryopreservation composition" may, but need not necessarily, be used herein to refer to such compositions.

As used herein, the term "cells, tissues and organs" may refer to organelles, cells, tissues, extracellular matrix, organs or other living biological constructs. According to some embodiments, the cells, tissues and organs may be human. According to other embodiments, the cells, tissues and organs may be non-human cells, tissues and organs. Non-human cells, tissues and organs may include mammalian cells, tissues and organs, and in particular may be derived from rodents. According to some embodiments, the cells, tissues and organs are retrieved from non-invasive sources, and may include human plucked hair follicles, cells derived from hair follicles (such as keratinocytes), urine derived cells and buccal cells. According to some embodiments, the cells, tissues and organs that have been transported and/or cryopreserved in the transportation and/or cryopreservation compositions of the present invention may be used for research and/or clinical and therapeutic use. In some embodiments of the present invention, the use of the transportation and/or cryopreservation composition results in good recovery rates and healthy cell populations for future use either, for example, in research applications or as a starting material for cell-based therapeutics.

As used herein, a person skilled in the relevant art may generally understand the term "effective amount" to be an amount sufficient to maintain the viability or limit the reduction of the viability of cells, tissues or organs. In the case of the embodiments of the present invention, an effective amount can include, but is not limited to, an amount to maintain the viability or limit the reduction of the viability of cells, tissues or organs that have experienced transportation and/or cryopreservation.

The present invention relates to the discovery that naringenin may help maintain the viability or limit the reduction of viability of cells, tissues and organs in transportation and/or cryopreservation compositions. Naringenin is a flavanone that is predominantly found in citrus fruits. Persons skilled in the art may appreciate that naringenin demonstrates some antioxidant activities, which may help provide protection to cells, tissues and organs from damaging free radicals. Naringenin may have additional properties well suited for the transportation and/or cryopreservation of cells, tissues and organs. For example, naringenin has been reported to exhibit antifungal, antibacterial and antiviral properties (See, for example, References [4] and [5]), which are useful for preventing undesirable external contamination and decreasing the need for antibiotics in transportation and/or cryopreservation compositions. Persons skilled in the art may appreciate that in a composition, low concentrations of naringenin can induce keratinocyte proliferation (See, for example, Reference [6]), allowing for quicker recovery from transportation and cryopreservation. Additionally, naringenin is reported to be an inducer of heat shock proteins (See, for example, Reference [7]), potentially generating protection from sudden changes in temperature (hot or cold) during transportation and cryopreservation. Promising pharmaceutical uses of naringenin have been shown in clinical trials (See, for example, Reference [21]).

According to some embodiments of the present invention, there are provided compositions that comprise naringenin, a buffering system and a sugar component. These compositions may be used for the transportation and/or the cryopreservation of cells, tissues and organs. Preferably, the compositions of the present invention are formulated to mimic the cellular environment, protect cells, tissues and organs from damage, and improve viability, recovery, and/or usability of the cells, tissues and organs after transportation and/or cryopreservation. In some embodiments of the present invention, the composition of compounds are provided at concentrations to optimize the viability of keratinocyte cells. All individual components of the disclosed transportation and/or cryopreservation compositions are preferably, but need not necessarily be, pharmaceutical grade and/or animal component-free.

According to some embodiments, the transportation and/or cryopreservation composition includes naringenin in a concentration from about 0.01 μM to about 10 μM. According to some embodiments, the composition includes naringenin in a concentration from about 0.01 μM to about 0.25 μM. According to some embodiments, the transportation and/or cryopreservation composition may contain at least one other flavonoid in combination with naringenin.

According to some embodiments, the transportation and/or cryopreservation composition includes a buffering system. According to some embodiments, the buffering system will enable the composition to maintain a physiologically relevant pH of around 7.4 outside a $CO_2$ incubator in hypothermic conditions. In an aspect, the buffering system may comprise a synthetic biological buffer, such as HEPES or BES. Any suitable synthetic biological buffer with a similar pH to HEPES is contemplated. The synthetic biological buffer may be at a concentration of about 15 mM to about 45 mM.

According to some embodiments, the buffering system of the described transportation and/or cryopreservation may alternatively or further comprise hydrogen bicarbonate at a concentration of about 2 mM to about 20 mM. Preferably, the concentration of hydrogen bicarbonate is about 3 mM to about 9 mM.

According to some embodiments, the buffering system of the described transportation and/or cryopreservation may alternatively or further comprise hydrogen phosphate at a concentration of about 6 mM to about 25 mM. Preferably, the concentration of hydrogen phosphate is about 10 mM to about 15 mM.

According to some embodiments, the transportation and/or cryopreservation composition includes a sugar component. Any suitable type of sugar is contemplated. Persons skilled in the art may appreciate that suitable sugar components may include, but are not limited to glucose, mannitol and sucrose. According to some embodiments, the sugar component is glucose, and preferably D-glucose. Persons skilled in the art may appreciate that glucose acts as an energy source. Glucose aids with the production of ATP and other energy storing nucleotide triphosphates, as well as energy rich hydrogens of NADP and NAD. In addition, proper energy metabolism in the cells may depend on multiple pathways that glucose is involved with, such as the glycolytic pathway, the pentose phosphate pathway and the citric acid cycle. According to some embodiments, the glucose is at a concentration of about 2 mM to about 25 mM and, more preferably, from about 9 mM to about 15 mM.

According to some embodiments, the transportation and/or cryopreservation composition may further comprise adenosine, which provides a source of ATP.

According to some embodiments, the transportation and/or cryopreservation composition includes ionic concentrations of sodium, calcium, potassium, chloride, magnesium or a combination thereof that are based on normal extracellular fluid values found in the environment of cells, tissues and organs and may preferably but need not necessarily be similar to Krebs-Ringer balanced salt solution. According to other embodiments, the composition contains lower amounts of sodium, chloride, calcium or a combination thereof compared to a normal extracellular environment. Persons skilled in the art may appreciate that salts may play a role in maintaining physiologically relevant osmotic balance for cells, tissues and organs. Individually, ions and cations may play a role in necessary biochemical functions through solute pump activity in the plasma membrane to signal transduction pathways. For example, keratinocytes may be sensitive to calcium such that a concentration greater than 1 mM induces terminal differentiation and/or cell death.

In some embodiments of the transportation and/or cryopreservation composition, the concentration of sodium ions is about 20 mM to about 120 mM. More preferably, the concentration of sodium ions is about 70 mM to about 90 mM.

In some embodiments, the transportation and/or cryopreservation composition, the concentration of calcium ions is about 0.01 mM to about 1 mM. More preferably, the concentration of calcium ions is about 0.03 mM to about 1 mM. In a preferred embodiment, the composition contains about 0.06 mM of calcium to reduce or prevent keratinocyte terminal differentiation. Persons skilled in the art may appreciate that calcium regulates keratinocyte differentiation. It has been reported that calcium concentrations equal to or greater than about 1 mM induces the stratification and terminal differentiation of keratinocyte. In addition, it has also been reported that a propagating cell source—especially for the outgrowth of keratinocytes from a plucked follicle—terminally differentiated keratinocytes are less effective and in some cases unusable (See, for example, Reference [1]).

In some embodiments of the transportation and/or cryopreservation composition, the concentration of chloride ions is about 10 mM to about 70 mM. More preferably, the concentration of chloride ions is about 40 mM to about 60 mM.

In some embodiments of the transportation and/or cryopreservation composition, the concentration of potassium ions is about 2 mM to about 12 mM. More preferably, the concentration of potassium ions is about 2 mM to about 5 mM.

In some embodiments of the transportation and/or cryopreservation composition, the concentration of magnesium ions is about 0.1 mM to about 1 mM. More preferably, the concentration of magnesium ions is about 0.4 mM to about 0.7 mM. Preferably, any combination of salt forms can be used (for example KCl vs NaCl). Preferably, the final ion concentration is the same.

Persons skilled in the art may appreciate that glutamine is important for the growth of cells as a nitrogen source. Glutamine is also important for the synthesis of multiple regulators and energy carriers in metabolic pathways such as NAD, NADH, and purine nucleotides (See, for example, Reference [2]). Glutamine may also be used as an energy source when glucose levels are low (See, for example, Reference [2]). However, glutamine has been reported to be unstable for long-term storage. Over time, glutamine may easily and non-enzymatically break down into ammonia and pyroglutamate, forming a toxic environment for cells, tissues and organs. According to some embodiments, the transportation and/or cryopreservation composition of the present invention includes alanyl-glutamine, a stable form of glutamine comprising L-glutamine and L-alanine that can facilitate the long-term storage of cells, tissues and organs. According to some embodiments, the concentration of alanyl-glutamine in the composition is from about 0.2 mM to about 10 mM and, more preferably, from about 1 mM to about 5 mM.

According to some embodiments, the transportation and/or cryopreservation composition further comprises the antioxidant (+)-6-Hydroxy-2,5,7,8-tetramethylchromane-2-carboxylic acid (e.g. TROLOX™), a vitamin E analogue. Persons skilled in the art may appreciate that (+)-6-Hydroxy-2,5,7,8-tetramethylchromane-2-carboxylic acid is especially relevant with the use of keratinocytes for reducing cell death from ultraviolet B-induced $H_2O_2$ and improving survival rates (See, for example, Reference [3]). The use of (+)-6-Hydroxy-2,5,7,8-tetramethylchromane-2-carboxylic acid may reduce oxidative stress resulting from the transportation and/or cryopreservation process (e.g., during thawing). According to some embodiments, the concentration of (+)-6-Hydroxy-2,5,7,8-tetramethylchromane-2-carboxylic acid is about 0.01 µM to about 10 UM and, more preferably, the concentration is about 0.05 µM to about 0.25 µM.

According to some embodiments, the transportation and/or cryopreservation composition may comprise vitamin E instead of (+)-6-Hydroxy-2,5,7,8-tetramethylchromane-2-carboxylic acid.

According to some embodiments, the transportation and/or cryopreservation composition does not contain serum or any animal components. Persons skilled in the art may appreciate that serum and other animal components are traditionally used in many growth media and transportation and cryopreservation compositions as a source of amino acids, lipids, hormones, vitamins and trace elements. However, risks such as pathogen contamination and inconsistency between batches may be associated with their use. In addition, it has been reported that xenocompounds found in serum and other animal components may cause detrimental immune reactions in human clinical settings and therapeutics.

Progress has been made in recent years to develop chemically defined, serum-free alternatives. Three compounds useful to cells, tissues and organs that have been identified in serum are insulin, transferrin and selenium (in the form of sodium selenite). Persons skilled in the art may appreciate that insulin regulates the uptake and utilization of glucose and amino acids, transferrin is an ion carrier important for maintaining cellular homeostasis, and sodium selenite is preferably a trace element for proper keratinocyte maintenance. In trace amounts, selenium, a constituent of selenoproteins, may be needed for proper cell health by a multitude of enzymatic and structural elements. It has been reported that in keratinocytes, selenium may be needed for proper cellular function and health, preventing apoptosis from ultraviolet B radiation, promoting keratinocyte proliferation, preserving stemness, preventing cellular senescence, and maintaining homeostasis during aging increasing their replicative lifespan (See, for example, Reference [8]). According to some embodiments, the transportation and/or cryopreservation composition may further comprise insulin, transferrin, selenium (in the form of sodium selenite), or a combination thereof. According to some embodiments, the composition may comprise insulin at a concentration of about 0.1 µg/mL to about 20 µg/mL and, more preferably, at a concentration of about 8 µg/mL to about 12 µg/mL. According to some embodiments, the composition may comprise transferrin at a concentration of about 1 µg/mL to about 20 µg/mL, and more preferably, at a concentration of about 3 µg/mL to about 7 µg/mL. According to some embodiments, the composition may comprise sodium selenite at a concentration of about 5 nM to about 50 nM and, more preferably, from about 20 nM to about 40 nM.

According to some embodiments, the transportation and/or cryopreservation composition may further comprise capase inhibitors to minimize cell death from apoptosis.

According to some embodiments, the transportation and/or cryopreservation composition may further comprise at least one antibiotic, to help minimize bacterial contamination in the composition. Any suitable antibiotic or combination of antibiotics to help minimize bacterial contamination is contemplated. According to some embodiments, the composition contains penicillin, streptomycin or a combination thereof. According to some embodiments, the composition may include the antibiotic penicillin at a concentration of about 10 units/mL to about 200 units/mL, or more preferably, at a concentration of about 80 units/mL to about 120 units/mL. According to alternate or further embodiments, the composition may include the antibiotic streptomycin at a concentration of about 0.01 mg/mL to about 1 mg/mL, or more preferably, at a concentration of about 0.08 mg/mL to about 0.2 mg/mL.

According to some embodiments, the cryopreservation composition further comprises at least one cryoprotectant. Persons of skill in the art may appreciate that cryoprotectants help to modify the freezing behaviour of cells, thereby helping to prevent damage to cells, tissues and organs that may occur during the cryopreservation process. During the cryopreservation process there is a risk that cells will experience a cooling injury due to the formation of ice crystals inside or outside the cells. For example, if cells are frozen too quickly, more water may remain in the cells, which may aggregate into larger ice crystals that may cause mechanical damage to the cells. Slow cooling may allow cells to rapidly lose water and prevent internal freezing, but may cause the cells to drastically shrink in volume. Intracellular problems may also result from the cryopreservation process. It has been reported that cell shrinkage during slow cooling may distort the nuclear membrane and cause DNA to break if the DNA is tightly packed around chromatin (See, for example, Reference [9]). It has also been reported that crowding of macromolecules as a result of the decreased cell size may inhibit DNA repair mechanisms resulting in genetic damage (See, for example, Reference [9]). During slow cooling, cells may experience hyperosmotic stress as a result of their rapid water loss. It has been reported that cryoprotectants may affect the rate of water transport and ice crystal growth, both of which help protect cells, tissues and organs against ice crystal formation by stabilizing proteins within the cells, tissues and organs (See, for example, Reference [10]).

The choice of an effective cryoprotectant may be essential for the proper cryopreservation of cells, tissues and organs. According to some embodiments, the composition may comprise at least one of the following cryoprotectants: Dextran 40, sucrose and DMSO. Persons skilled in the art may appreciate that Dextran 40 is a polysaccharide of glucose units at an average molecular weight of about 40,000 generally used as an important compound in blood-plasma volume expanders. In other applications, Dextran 40 may act as a safe and/or effective cryoprotectant, contributing to a controlled ice crystal formation. According to some embodiments, the composition may comprise Dextran 40 as a cryoprotectant at a concentration of about 0.001 g/mL to about 0.2 g/mL, and more preferably, at a concentration of about 0.03 g/mL to about 0.07 g/mL. Sucrose may also be used as a non-penetrating cryoprotectant. According to some embodiments, the composition may comprise sucrose as a cryoprotectant at a concentration of about 10 mM to about 60 mM and, more preferably, from about 20 mM to about 40 mM.

According to some embodiments, the composition may comprise DMSO as a cryoprotectant. Persons skilled in the art may appreciate that DMSO is a commonly used cryoprotectant that has demonstrated for many years to be effective over a wide range of different cell, tissue and organ types. While it may have been reported to readily cross the cell membrane to provide protection to the cell, such an entry may cause changes to the cell's water volume which can result in damage. Also, as DMSO has been reported to be toxic to cells at room temperature and may cause adverse reactions in animals and humans, as much DMSO as possible should be removed from cells, tissues and organs before they are used in clinical or therapeutic applications (See, for example, Reference [11]). In the prior art, DMSO is typically used at concentrations of 10% (vol/vol). It may be desirable to reduce the amount of DMSO used in transportation and/or cryopreservation compositions due to the reported potential for cell damage. According to some embodiments, the composition comprises DMSO in a concentration of about 0.1% (vol/vol) to about 20% (vol/vol) and, more preferably, in a concentration of about 2.5% (vol/vol) to about 10% (vol/vol). According to a preferable embodiment, the concentration of DMSO is about 5% (vol/vol).

According to some embodiments, the transportation and/or cryopreservation composition has a final osmolality from about 190 mOsm/kg to about 380 mOsm/kg and a pH from about 6.9-7.5.

According to some embodiments, a cryopreservation composition is first used to store cells, tissues or organs, and then a transportation composition is used to transport and/or store the same cells, tissues or organs. According to other embodiments, a transportation composition is first used to transport and/or store cells, tissues or organs in the short-term, and then a cryopreservation composition is then used for the long-term storage of the same cells, tissues or organs. Attention is directed to FIG. 1, which depicts an example of a transportation and cryopreservation pipeline that may be used with various non-limiting embodiments of the transportation and cryopreservation compositions of the present invention. In accordance with some embodiments of the present invention, cells, tissues and organs of interest may be added to a transportation composition and viably transported from a first location to a second location (e.g., a laboratory, clinic, etc.) for experimentation, analysis, therapeutics and/or cryopreservation. In some embodiments, the cells, tissues and organs are then placed into a cryopreservation composition before undergoing a cryopreservation process. In accordance with a preferred embodiment, the cells, tissues and organs may be cryopreserved for an undefined amount of time without a significant reduction in viability until there is need for future experimentation, analysis and/or therapeutics. The present example is for demonstrative purposes and should not be considered limiting for the use of the invention in any way.

Figure 2:
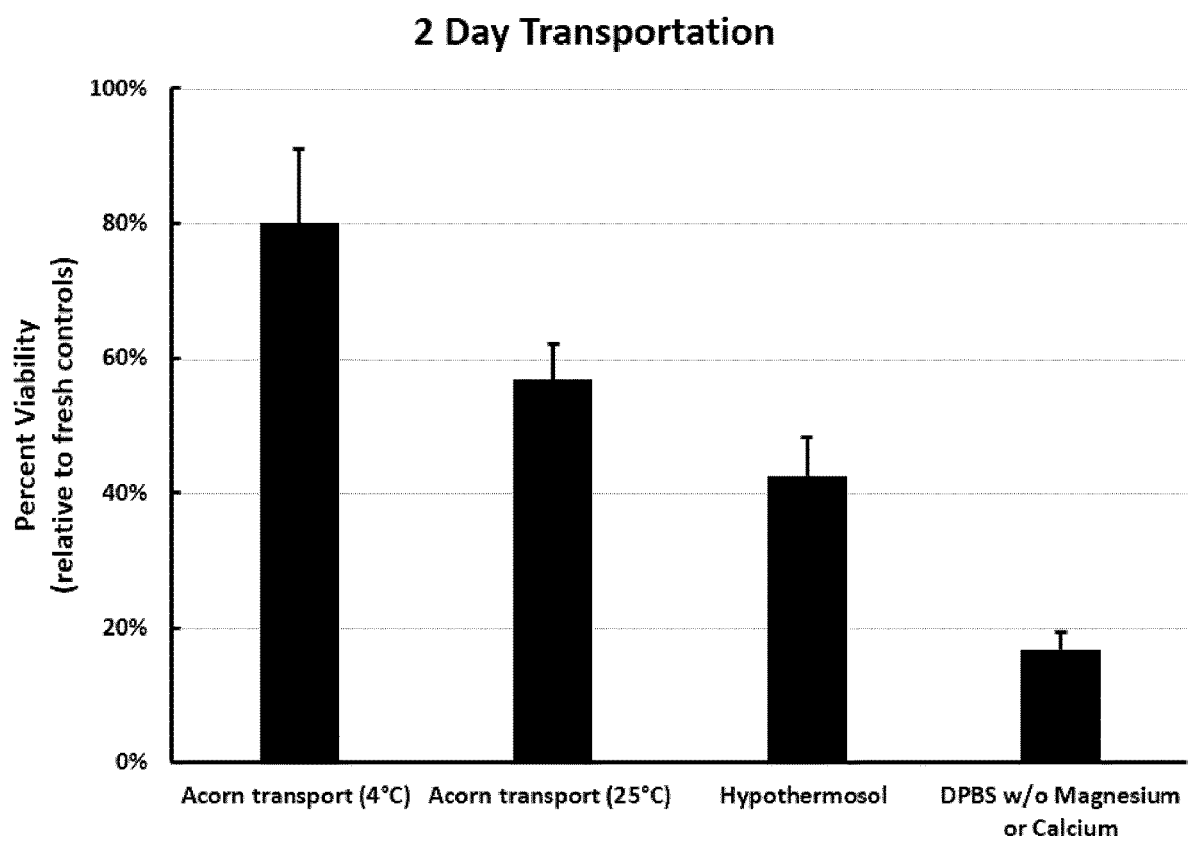
FIG. 2 depicts a graph illustrating the percent viability of human plucked hair follicles after two days of transportation in various transportation compositions.

In accordance with some embodiments of the present invention, a transportation composition is formulated to maintain a viability greater than about 50% after transportation of a predetermined duration (e.g., two days) at about 25° C., and more preferably about 80%, after transportation of a predetermined duration (e.g., two days) at about 4° C. This transportation composition is preferably, but need not necessarily be, more effective than other currently available compositions such as, for example, HypoThermosol. Attention is directed to FIG. 2, which depicts the percent viability of human plucked hair follicles after two days of transportation in various transportation compositions. As a first step, human hair follicles were plucked and placed in three different transport media: 1) transportation medium in accordance with the present invention; 2) HypoThermosol as a comparator transport medium; and 3) Dulbecco's Phosphate-Buffered Saline ("DPBS") without magnesium or calcium as a control. As a second step, hair follicles were then placed in a mock transportation of about two days maintaining a temperature of about 25ºC or about 4ºC. After two days, hair follicle viability relative to fresh controls was measured by the AlamarBlue assay. Analyses by a one-way ANOVA and post-hoc Tukey test obtain statistical significance of $p<0.05$ when comparing the transportation composition of the present invention to the HypoThermosol comparator and DPBS control. The foregoing trial was repeated five times.

Figure 3:
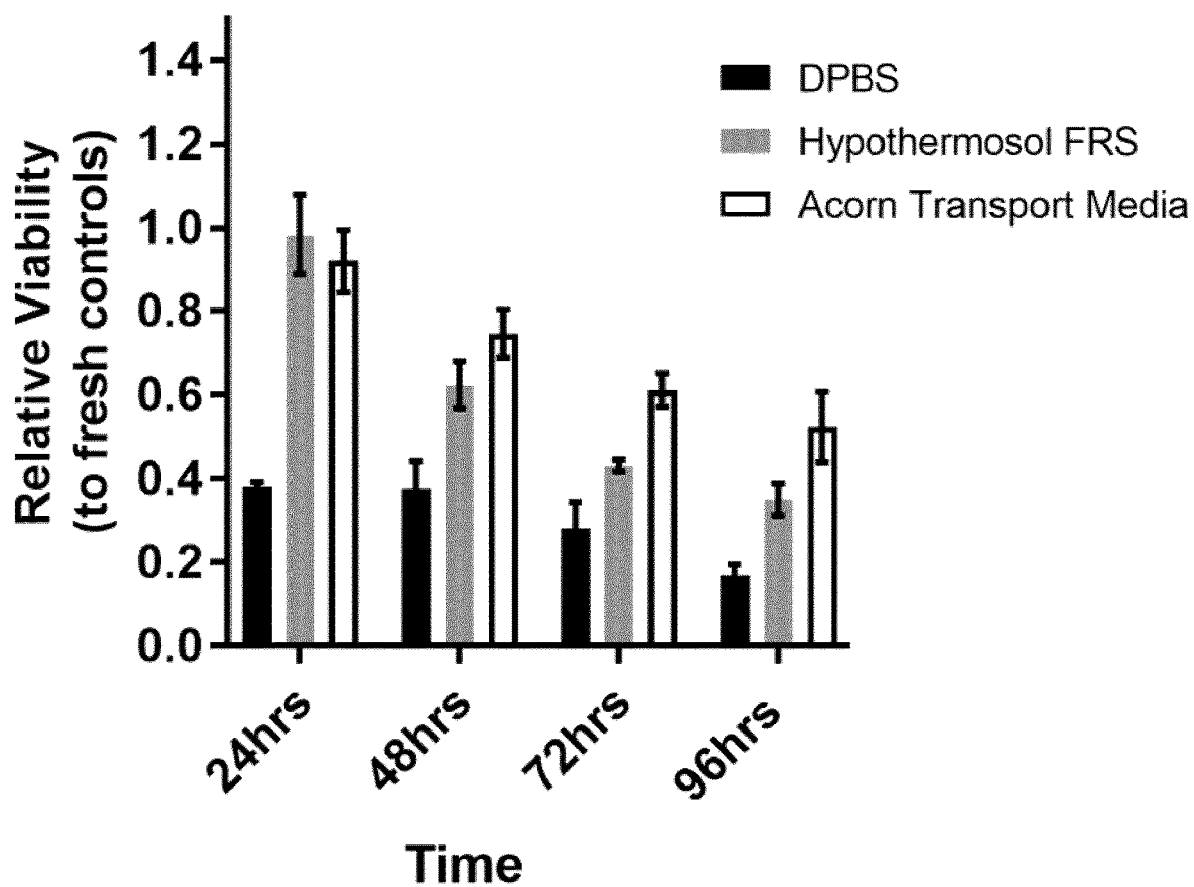
FIG. 3 depicts a graph illustrating the relative viability of human plucked hair follicles, compared to fresh controls, in various transportation compositions over time.

FIG. 3 depicts the relative viability of human plucked hair follicles over time in either Dulbecco's Phosphate-Buffered Saline ("DPBS") without magnesium or calcium as a nutrient-free control, Hypothermosol FRS as a comparator transport composition, and a transportation composition in accordance with an embodiment of the present invention. Transportation temperature was set to 4ºC. Relative viability was calculated by comparing the viability of the human hair follicles that underwent transportation to the viability of freshly plucked human hair follicle controls that did not undergo transportation. At each time point, viability was measured by the AlamarBlue assay. The foregoing trial was repeated three times. In this figure it is shown how the human hair follicles in the transportation composition in accordance with an embodiment of the present invention can maintain relatively higher viability values post 24 hours compared to other types of compositions. This is of importance in relation to the transportation of cells, tissues and organs by mail where most deliveries depending on locations, delays in mail, delays in import/export, delays in customs, can lead to transport times greater than 24 hours.

Figure 4:
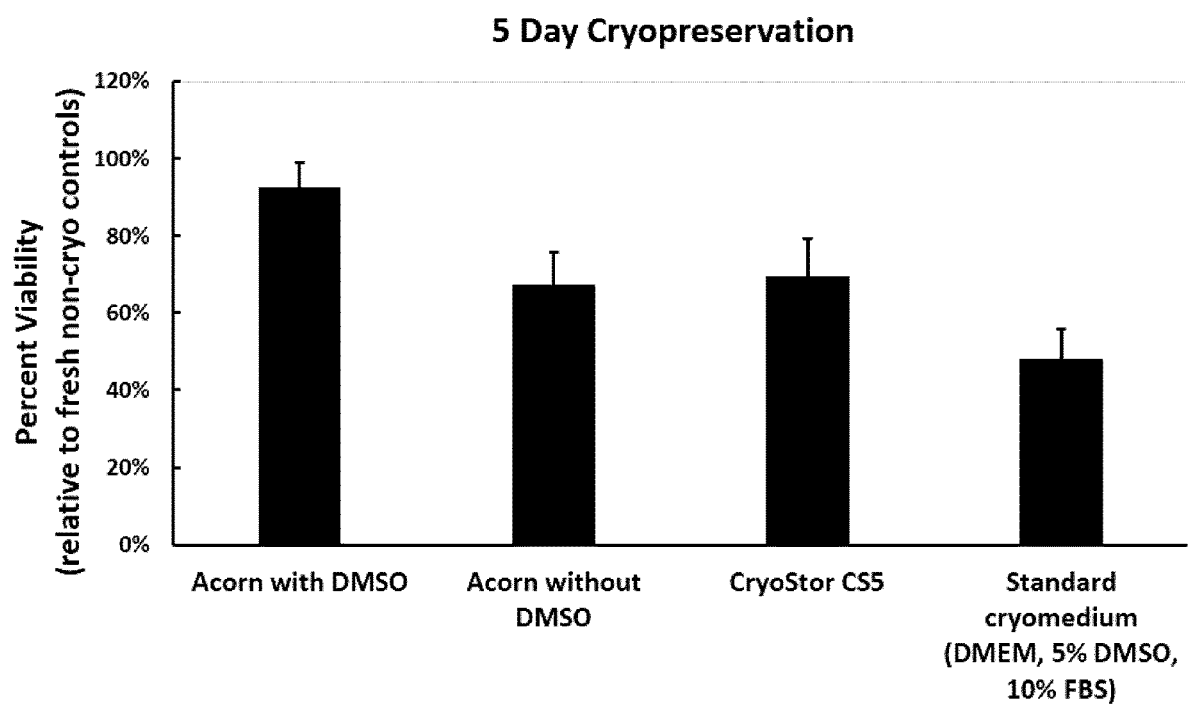
FIG. 4 depicts a graph illustrating the percent viability of human plucked hair follicles after five days of cryopreservation in various cryopreservation compositions.

FIG. 4 depicts the percent viability of human plucked hair follicles after five days of cryopreservation. Human hair follicles were plucked and placed in four different cryopreservation compositions: 1) a cryopreservation composition containing 5% DMSO in accordance with an embodiment of the present invention; 2) a cryopreservation composition in accordance with an embodiment of the present invention except without DMSO; 3) CryoStor CS5 containing 5% DMSO; and 4) a standard cryopreservation composition comprising 5% DMSO and 10% FBS in DMEM. Prior to cryopreservation, hair follicles in these different compositions were brought down to about −80°C at a consistent rate of about 1°C per minute with the use of a CoolCell LX freezing container. Vials containing hair follicles were then placed in a vapour phase liquid nitrogen cryopreservation tank for five days. After five days of cryopreservation, vials containing follicles were quickly thawed in a 37° C. water bath. Viability of the hair follicles was then measured relative to fresh non-cryopreserved hair follicles using the AlamarBlue assay. Analyses by one-way ANOVA and post-hoc Tukey test obtained statistical significance of $p<0.05$ when comparing the cryopreservation composition with 5% DMSO in accordance with an embodiment of the present invention to the CryoStor CS5 and the standard cryopreservation composition. No statistical significance was reached between the cryopreservation composition without 5% DMSO in accordance with an embodiment of the present invention and CryoStor CS6. N=6.

Figure 5:
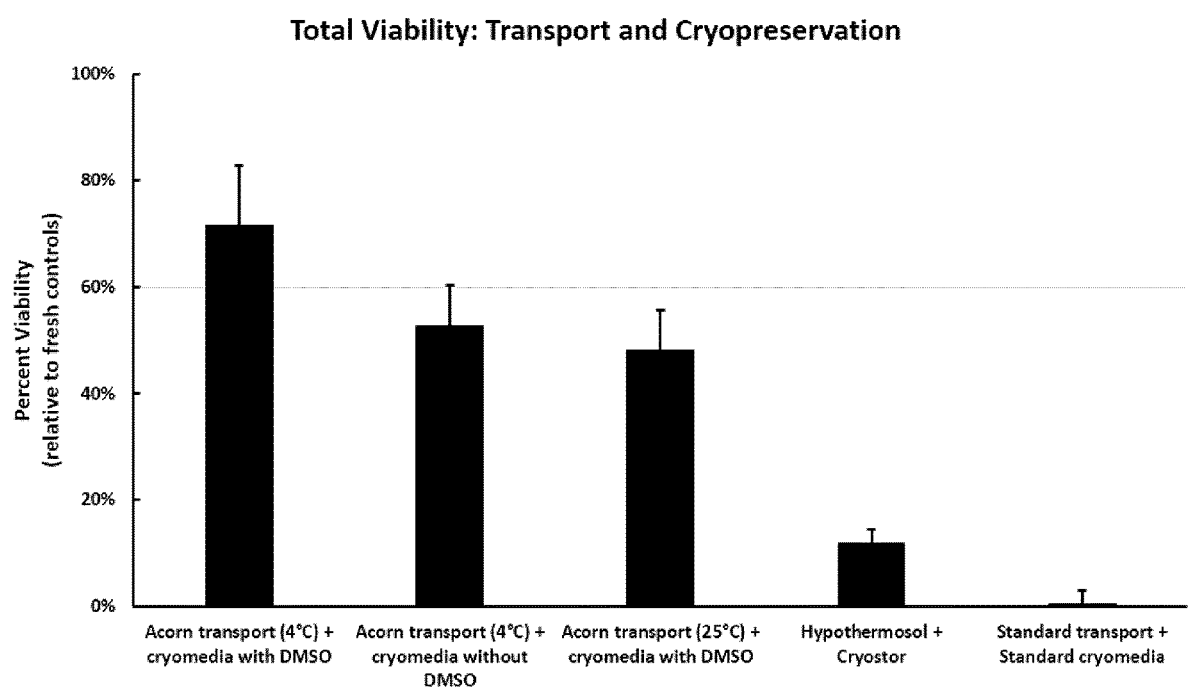
FIG. 5 depicts a graph illustrating the percent viability of human plucked hair follicles, relative to fresh controls, after two days of transportation and five days of cryopreservation in various compositions.

FIG. 5 depicts the percent viability of human plucked hair follicles after a two day transportation followed by a five day cryopreservation process. Human hair follicles were plucked and placed in three different transportation compositions: 1) a transportation composition in accordance with an embodiment of the present invention; 2) HypoThermosol as a competitor transport composition; and 3) Dulbecco's Phosphate-Buffered Saline ("DPBS") without magnesium or calcium as a standard composition. Hair follicles were then placed in a mock transportation of two days maintaining a temperature of about 25°C or about 4°C. After two days, hair follicle transportation viability ($V_t$) relative to fresh controls was measured by the AlamarBlue assay. To assess viability after cryopreservation, human hair follicles were plucked and placed in four different cryopreservation compositions: 1) the cryopreservation composition containing 5% DMSO in accordance with an embodiment of the present invention; 2) a cryopreservation composition in accordance with an embodiment of the present invention except without DMSO; 3) CryoStor CS5 containing 5% DMSO; and 4) a standard cryopreservation composition comprising 5% DMSO and 10% FBS in DMEM. Before cryopreservation, hair follicles in these different compositions were cooled to about −80°C at a decreasing rate of about 1°C per minute with the use of a CoolCell LX freezing container. Vials containing hair follicles were then placed in a vapour phase liquid nitrogen cryopreservation tank for five days. After five days of cryopreservation, vials containing hair follicles were quickly thawed in a water bath at about 37°C. Viability of the hair follicles after cryopreservation ($V_c$) was then measured relative to fresh non-cryopreserved follicles using the AlamarBlue assay. Analyses by one-way ANOVA and post-hoc Tukey test obtained statistical significance of $p<0.05$ when comparing the combinatorial use of the cryopreservation composition with and without 5% DMSO in accordance with an embodiment of the present invention to HypoThermosol+CryoStor CS5 combinatorial use and standard transport and cryopreservation medium combination. N=6.

FIGS. 4 and 5 demonstrate the effectiveness of the transportation and/or cryopreservation compositions of the present invention with and without DMSO compared to CryoStor CS5 containing 5% DMSO.

According to some embodiments of the present invention, the compositions disclosed may be similar to each other in regards to the transportation and cryopreservation composition as both may preferably but need not necessarily be used together (as shown in FIG. 1) for the transportation and/or cryopreservation of cells, tissues, and/or organs.

Persons skilled in the art may appreciate that cells isolated from hair follicles have many potential uses in regenerative medicine. Anagen phase hairs can be plucked directly from the scalp. Such hairs possess a waxy cuticle with a distinct hair bulb and outer root sheath that contain keratinocytes and cells with an increased ability to regenerate hair and heal wounds (See, for example References [12], [13], [14]). Keratinocytes derived from follicles may be cultured (as shown in FIG. 6) and used to generate iPSC lines with an overall reprogramming efficiency from retroviral transduction with OCT4, SOX2, KLF4 and c-MYC of close to about 1% compared to an efficiency of less than about 0.01% when using fibroblast cultures (See, for example, References [15], [16]).

Figure 6:
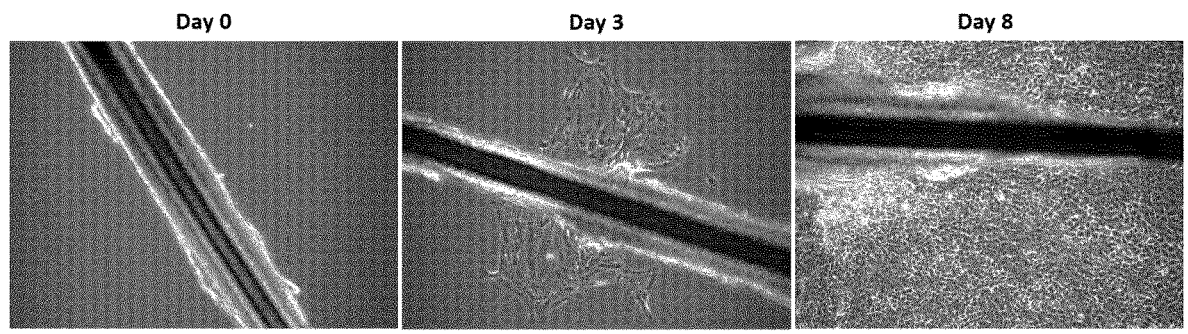
FIG. 6 depicts photographs containing an example of keratinocyte outgrowth from a fresh hair follicle in chemically defined serum-free conditions.

FIG. 6 depicts an example of keratinocyte outgrowth from a fresh hair follicle in chemically defined serum-free conditions. Pictures were taken at 100× magnification on a Leica DMi 8 phase-contrast microscope. By day eight, confluent monolayers of keratinocytes were obtained and could be trypsinized for further culturing and expansion. The protocol followed was from Hung et al., 2015 (See Reference [20]). Keratinocyte outgrowth were also obtained after transport and cryopreservation in the preferred embodiments of the present invention.

Persons skilled in the art may appreciate that from a single urine sample, a variety of cell types may be collected, including but not necessarily urothelial-like cells, smooth muscle-like cells, endothelial-like cells, interstitial-like cells, and/or a subpopulation of cells displaying stem cell-like characteristics termed "urine-derived stem cells" ("USCs"). USCs may preferably but need not necessarily comprise around 0.2% of the cells in voided urine with an average collection of from 5 to 10 USCs per 100 mL and have been reported to originate from parietal stem cells in the renal glomerulus (See, for example, Reference [17]). It has been reported that USCs are adherent and can be expanded in culture with a success rate of 82% (See, for example, Reference [18]). These cells exhibit mesenchymal stem cell markers (CD117, CD73, CD90, CD105) in early passages but are negative for hematopoietic stem cell markers (See, for example, Reference [18]). They are considered to be multipotent with differentiating capabilities into lineages of urothelial cells, smooth muscle cells, neurogenic cells, osteocytes, adipocytes, and chondrocytes (See, for example, References [17, 18]). Additionally, as with keratinocytes, it has been reported that the use of USCs as precursor cells for iPSC generation demonstrated to be shorter (12 days) and more efficient than traditional methods with fibroblasts (See, for example, Reference [19]). IPSC generation efficiency may be a result of intrinsic expression of two reprogramming factors, c-myc and klf4, in addition to the higher telomerase activity observed in USCs (See, for example, Reference [19]). As a result, USCs have many potential uses in regenerative medicine, especially relating to urinary tract and/or kidney repair.

The above description is meant to be exemplary only, and one skilled in the art will recognize that changes may be made to the embodiments described without departing from the scope of the invention disclosed. Modifications which fall within the scope of the scope of the present invention will be apparent to those skilled in the art, in light of a review of this disclosure, and such modifications are intended to fall within the appended claims.

This concludes the description of presently preferred embodiments of the invention. The foregoing description has been presented for the purpose of illustration and is not intended to be exhaustive or to limit the invention to the precise form disclosed. Other modification, variations and alterations are possible in light of the above teaching and will be apparent to those skilled in the art, and may be used in the design and manufacture of other embodiments according to the present invention without departing from the spirit and scope of the invention. It is intended the scope of the invention be limited not by this description but only by the claims forming a part hereof.

EXAMPLES

The invention will be further illustrated by the following non-limiting examples. These examples are set forth to aid in the understanding of the invention but are not intended to, and should not be construed to, limit its scope in any way. The examples do not include detailed descriptions of conventional methods that would be well known to those of ordinary skill in the art.

Example 1—Formulation of Transportation Composition

This example sets out a preferred formulation of the transportation composition in accordance with an aspect of the present invention for transporting cells, tissues and organs.

In preferred embodiments of the invention, naringenin and TROLOX™ stock is prepared in DMSO to a final concentration of 100 mM. Then from the stock, a working solution of naringenin and a working solution of TROLOX™ are formulated by diluting stock in endotoxin-free milliQ water to a final concentration of 0.4 mM (0.4% (v/v) DMSO).

Sodium chloride, potassium chloride, calcium chloride, magnesium chloride hexahydrate, sodium bicarbonate, sodium phosphate dibasic anhydrous, HEPES, D-glucose and alanyl-glutamine are added to 500 mL of endotoxin-free milli-Q purified water while stirring to create a 10× solution.

The 10× solution contains:
a. 485 mM NaCl
b. 40 mM KCl
c. 0.6 mM $CaCl_2$)
d. 5 mM $MgCl_2$ Hexahydrate
e. 60 mM $Na_2CO_3$
f. 120 mM $Na_2HPO_4$
g. 230 mM HEPES
h. 110 mM D-(+)-glucose
i. 20 mM Ala-Gln Once completely dissolved, the solution is filter sterilized through a disposable sterile 0.22 μm filter system. For long-term storage, sodium bicarbonate from the 10× solution may be omitted and added fresh to the 1× solution instead. The 10× solution is stored at 4-8° C.

A 1× solution is formulated by diluting 5 mL of the 10× solution in 45 mL of endo endotoxin-free milli-Q purified water. The 1× solution is mixed well.

The naringenin and TROLOX™ working solutions are diluted to 0.05 UM and 0.1 μM respectively in the 1× solution.

The final 1× solution contains:
a. 48.5 mM NaCl
b. 4 mM KCl
c. 0.06 mM $CaCl_2$
d. 0.5 mM $MgCl_2$ Hexahydrate
e. 6 mM $Na_2CO_3$
f. 12 mM $Na_2HPO_4$
g. 23 mM HEPES
h. 11 mM D-(+)-glucose
i. 2 mM Ala-Gln
j. 0.05 μM Naringenin
k. 0.1 μM TROLOX™ [(+)-6-Hydroxy-2,5,7,8-tetramethylchromane-2-carboxylic acid]
l. 0.0005% (v/v) DMSO (solvent used for Naringenin and Trolox, final concentration should not exceed 0.0005% (v/v))

The final 1× solution is mixed well, then filter sterilized through a disposable sterile 0.22 μm filter system and stored at 4° C.

Example 2—Formulation of Cryopreservation Composition

The following example sets out a preferred formulation of the cryopreservation composition in accordance with an aspect of the present invention for the cryopreservation of cells, tissues and organs.

In preferred embodiments of the invention, formulations comprising naringenin and TROLOX™ stock in DMSO to a final concentration of 100 mM are prepared for both compounds. Then from the stock a working solution of naringenin and a working solution of TROLOX™ are formulated by diluting stock in DPBS-free magnesium and calcium to a final concentration of 0.4 mM.

Sodium chloride, potassium chloride, calcium chloride, magnesium chloride hexahydrate, sodium bicarbonate, sodium phosphate dibasic anhydrous, HEPES, D-glucose and alanyl-glutamine are added to 500 mL endotoxin-free milli-Q purified water while stirring to create a 10×solution.

The 10× solution contains:
a. 485 mM NaCl
b. 40 mM KCl
c. 0.6 mM $CaCl_2$)
d. 5 mM $MgCl_2$ Hexahydrate
e. 60 mM $Na_2CO_3$
f. 120 mM $Na_2HPO_4$
g. 230 mM HEPES
h. 110 mM D-(+)-glucose
i. 20 mM Ala-Gln A 1× solution is formulated by diluting 5 mL of the 10× solution in 45 mL of endo endotoxin-free milli-Q purified water. The 1× solution is mixed well.

The naringenin and TROLOX™ working solutions are diluted to 0.05 UM and 0.1 μM respectively in the 1× solution. Dextran 40 is added to the 1× solution to a final concentration of 5% (w/v), and sucrose is added to the 1× solution to a final concentration of 1% (w/v). DMSO is added to the 1× solution to a final concentration of 5% (v/v).

The 1× solution is mixed well, then filter sterilized through a disposable sterile 0.22 µm filter system and stored at 4° C.

In other embodiments, Dextran 40, sucrose and DMSO are added to the 1× solution described in Example 1. Dextran 40 is added to a final concentration of 5% (w/v), sucrose is added to a final concentration of 1% (w/v) and DMSO is added to a final concentration of 5% (v/v).

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of +5%, +10%, +20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

REFERENCES

[1.] Boyce, S. T. & Ham, R. G. (1983). Calcium-regulated differentiation of normal human epidermal keratinocytes in chemically defined clonal culture and serum-free serial culture. The Journal of Investigative Dermatology, 81: 33s-40s.

[2.] Stumvoll, M., Perriello, G., Meyer, C. & Gerich, J. (1999). Role of glutamine in human carbohydrate metabolism in kidney and other tissues. Kidney International, 55: 778-792.

[3.] Peus, D., Meves, A., Pott, M., Beyerle, A. & Pittelkow, M R. (2001). Vitamin E analog modulates UVB-induced signaling pathway activation and enhances cell survival. Free Radical Biology & Medicine, 30: 425-432.

[4.] Frabasile, S., Koishi, A. C., Kuczera, D., Silveira, G. F., Verri, W. A., dos Santos, C. N. D. & Bordignon, J. (2017). The citrus flavanone naringenin impairs dengue virus replication in human cells. Nature Scientific Reports, 7: 41864.

[5.] Menanteau-Ledouble, S., Krauss, I., Santos, G., Fibi, S., Weber, B. & El-Matbouli, M. (2015). Effect of a phytogenic feed additive on the susceptibility of Onchorhynchus mykiss to *Aeromonas salmonicida*. Diseases of Aquatic Organisms, 115: 57-66.

[6.] Madaan, A., Joshi, V., Kishore, A., Verma, R., Singh, A. T., Jaggi, M & Sung, Y. K. (2017). In vitro hair growth promoting effects of naringenin and hesperetin on human dermal papilla cells and keratinocytes. American Journal of Dermatology and Venereology, 6: 51-57.

[7.] Noda, S., Tanabe, S. & Suzuki, T. (2013). Naringenin enhances intestinal barrier function through the expression and cytoskeletal association of tight junction proteins in Caco-2 cells. Molecular Nutrition & Food Research, 57: 2019-2028.

[8.] Jobeili, L., Rousselle, P., Beal, D., Blouin, E., Roussel, A. M., Damour, O. & Rachidi, W. (2017). Selenium preserves keratinocyte stemness and delays senescence by maintaining epidermal adhesion. Aging, 9: 2302-2315.

[9.] Kopeika, J., Thornhill, A. & Khalaf, Y. (2014). The effect of cryopreservation on the genome of gametes and embryos: principles of cryobiology and critical appraisal of the evidence. Human Reproduction Update, 0: 1-19.

[10.] Gao, D. & Critser, J. K. (2000). Mechanisms of Cryoinjury in Living Cells. ILAR Journal, 41: 187-196.

[11.] Chaytor, J. L., Tokarew, J. M., Wu, L. K., Leclère, M., Tam, R. Y., Capicciotti, C. J., Guolla, L., von Moos, E., Findlay, C. S., Allan, D. S., Ben, R. N. (2012). Inhibiting ice recrystallization and optimization of cell viability after cryopreservation. Glycobiology, 22: 123-133.

[12.] Mistriotis, P. and Andreadis S. T. (2013). Hair follicle: a novel source of multipotent stem cells for tissue engineering and regenerative medicine. Tissue Engineering: Part B, 19: 265-278.

[13.] Gho, C. G., Braun, J. E., Neumann, H. A. & Ramaekers, F. C. (2004) Human follicular stem cells: their presence in plucked hair and follicular cell culture. British Journal of Dermatology, 150: 860-868.

[14.] Ansell, D. M., Kloepper, J. E., Thomason, H. A., Paus, R. & Hardman, M. J. (2011) Exploring the "Hair Growth-Wound Healing Connection": Anagen Phase Promotes Wound Re-Epithelialization. Journal of Investigative Dermatology, 131: 518-528.

[15.] Aasen, T. and Izpisua Belmonte, J. C. (2010). Isolation and cultivation of human keratinocytes from skin or plucked hair for the generation of induced pluripotent stem cells. Nature, 5: 371-382.

[16.] Petit, I., Kesner, N. S., Karry, R., Robicsek, O., Aberdam, E., Müller, F. J., Aberdam, D. & Ben-Shachar, D. (2012). Induced pluripotent stem cells from hair follicles as a cellular model for neurodevelopmental disorders. Stem Cell Research, 8: 134-140.

[17.] Bharadwaj, S., Liu, G., Shi, Y., Wu, R., Yang, B., He, T., Fan, Y., Lu, X., Zhou, X., Liu, H., Atala, A., Rohozinski, J. & Zhang, Y. (2013). Multipotential Differentiation of Human Urine-Derived Stem Cells: Potential for Therapeutic Applications in Urology. Stem Cells, 31: 1840-1856.

[18.] Long, T., Wu, R., Lu, X., Deng, J., Qin, D., Zhang, Y. (2015). Urine-Derived Stem Cells for Tissue Repair in the Genitourinary System. Stem Cell Research & Therapy, 5: 317-321.

[19.] Zhou, T., Benda, C., Dunzinger, S., Huang, Y., Ho, J. C., Yang, J., Wang, Y., Zhang, Y., Zhuang, Q., Li, Y., Bao, X., Tse, H., Grillari, J., Grillari-Voglauer, R., Pei, D. & Esteban, M. A. (2012). Generation of human induced pluripotent stem cells from urine samples. Nature Protocols, 7: 2080-2089.

[20.] Hung, S. C. S., Pébay, A., & Wong, R. C. B. (2015). Generation of integration-free human induced pluripotent stem cells using hair-derived keratinocytes. Journal of Visualized Experiments, 102: e53174.

[21.] Salehi, B., Fokou, P. V. T., Sharifi-Rad, M., Zucca, P., Pezzani, R., Martins, N., & Sharifi-Rad, J. (2019). The Therapeutic Potential of Naringenin: A Review of Clinical Trials. Pharmaceuticals, 12: 10.3390/ph12010011

The invention claimed is:

1. A transportation or cryopreservation composition comprising:
   a) naringenin,
   b) a buffering system comprising a synthetic biological buffer,
   c) a sugar component, and
   d) at least one of: about 0.1 µg/mL to about 20 µg/mL of insulin, about 1 µg/mL to about 20 µg/mL of transferrin, or about 5 nM to about 50 nM of sodium selenite,
   wherein the composition is a transportation or a cryopreservation composition for cells or tissues.

2. The composition according to claim 1, wherein the concentration of naringenin is about 0.01 µM to about 10 µM.

3. The composition according to claim 1, wherein the concentration of naringenin is about 0.01 µM to about 0.25 µM.

4. The composition according to claim 1, wherein the buffering system comprises one or more of:
   about 15 mM to about 45 mM of the synthetic biological buffer,
   about 2 mM to about 20 mM of hydrogen bicarbonate, or
   about 6 mM to about 25 mM of hydrogen phosphate.

5. The composition according to claim 1, wherein the buffering system comprises one or more of:
   about 15 mM to about 45 mM of the synthetic biological buffer,
   about 3 mM to about 9 mM of hydrogen bicarbonate, or
   about 10 mM to about 15 mM of hydrogen phosphate.

6. The composition according to claim 1, wherein the sugar component comprises about 2 mM to about 25 mM of D-glucose.

7. The composition according to claim 1, wherein the sugar component comprises about 9 mM to about 15 mM of D-glucose.

8. The composition according to claim 1, further comprising at least one of:
   about 20 mM to about 120 mM of sodium ions,
   about 0.01 mM to about 1 mM of calcium ions,
   about 10 mM to about 70 mM of chloride ions,
   about 2 mM to about 12 mM of potassium ions,
   about 0.1 mM to about 1 mM of magnesium ions,
   about 0.2 mM to about 10 mM of alanyl-glutamine, or
   about 0.01 µM to about 10 µM of (+)-6-hydroxy-2,5,7,8-tetramethylchromane-2-carboxylic acid.

9. The composition according to claim 1, further comprising at least one of:
   about 70 mM to about 90 mM of sodium ions,
   about 0.03 mM to about 1 mM of calcium ions,
   about 40 mM to about 60 mM of chloride ions,
   about 2 mM to about 5 mM of potassium ions,
   about 0.4 mM to about 0.7 mM of magnesium ions,
   about 1 mM to about 5 mM of alanyl-glutamine, or
   about 0.05 UM to about 0.25 µM of (+)-6-hydroxy-2,5,7,8-tetramethylchromane-2-carboxylic acid.

10. The composition according to claim 1, further comprising at least one of:
    about 8 µg/mL to about 12 µg/mL of insulin,
    about 3 µg/mL to about 7 µg/mL of transferrin, or
    about 20 nM to about 40 nM of sodium selenite.

11. The composition according to claim 1, further comprising at least one of:
    about 10 units/mL to about 200 units/mL of penicillin, or
    about 0.01 mg/mL to about 1 mg/mL of streptomycin.

12. The composition according to claim 1, further comprising at least one of:
    about 80 units/mL to about 120 units/mL of penicillin, or
    about 0.08 mg/mL to about 0.2 mg/mL of streptomycin.

13. The composition according to claim 1, further comprising at least one of:
    about 0.001 g/mL to about 0.2 g/mL of dextran 40,
    about 10 mM to about 60 mM of sucrose, or
    about 0.1% (v/v) to about 20% (v/v) of dimethylsulfoxide, and
    wherein the composition is a cryopreservation composition for the cells or tissues.

14. The composition according to claim 1, further comprising at least one of:
    about 0.03 g/mL to about 0.07 g/m of dextran 40,
    about 20 mM to 40 mM of sucrose, or
    about 2.5% (v/v) to about 10% (v/v) of dimethylsulfoxide, and
    wherein the composition is used for the cryopreservation of cells or tissues.

15. The composition according to claim 1, wherein the cells or tissues are human hair follicles.

16. A transportation composition comprising:
about 0.01 µM to about 0.25 µM of naringenin,
about 15 mM to about 45 mM of a synthetic biological buffer,
about 3 mM to about 9 mM of hydrogen bicarbonate,
about 10 mM to about 15 mM of hydrogen phosphate,
about 9 mM to about 15 mM of D-glucose,
about 70 mM to about 90 mM of sodium ions,
about 0.03 mM to about 1 mM of calcium ions,
about 40 mM to about 60 mM of chloride ions,
about 2 mM to about 5 mM of potassium ions,
about 0.4 mM to about 0.7 mM of magnesium ions,
about 1 mM to about 5 mM of alanyl-glutamine, and
about 0.05 µM to about 0.25 µM of (+)-6-hydroxy-2,5,7,8-tetramethylchromane-2-carboxylic acid, and
wherein the transportation composition is for cells or tissues.

17. A cryopreservation composition comprising:
about 0.01 µM to about 0.25 µM of naringenin,
about 15 mM to about 45 mM of a synthetic biological buffer,
about 3 mM to about 9 mM of hydrogen bicarbonate,
about 10 mM to about 15 mM of hydrogen phosphate,
about 9 mM to about 15 mM of D-glucose,
about 70 mM to about 90 mM of sodium ions,
about 0.03 mM to about 1 mM of calcium ions,
about 40 mM to about 60 mM of chloride ions,
about 2 mM to about 5 mM of potassium ions,
about 0.4 mM to about 0.7 mM of magnesium ions,
about 1 mM to about 5 mM of alanyl-glutamine,
about 0.05 M to about 0.25 µM of (+)-6-hydroxy-2,5,7,8-tetramethylchromane-2-carboxylic acid,
about 0.03 g/mL to about 0.07 g/m of dextran 40,
about 20 mM to 40 mM of sucrose, and
less than about 5% (v/v) of dimethylsulfoxide, and
wherein the cryopreservation composition is for cells or tissues.

* * * * *

UNITED STATES PATENT AND TRADEMARK OFFICE
CERTIFICATE OF CORRECTION

PATENT NO. : 12,058,997 B2
APPLICATION NO. : 17/264602
DATED : August 13, 2024
INVENTOR(S) : Patrick G. Pumputis et al.

It is certified that error appears in the above-identified patent and that said Letters Patent is hereby corrected as shown below:

In the Claims

At Column 20, Line 25, Claim 8, delete "(+)" and insert -- (±) --, therefor.
At Column 20, Line 35, Claim 9, delete "UM" and insert -- µM --, therefor.
At Column 20, Line 35, Claim 9, delete "(+)" and insert -- (±) --, therefor.
At Column 21, Line 14, Claim 16, delete "(+)" and insert -- (±) --, therefor.
At Column 22, Line 12, Claim 17, delete "M" and insert -- µM --, therefor.
At Column 22, Line 12, Claim 17, delete "(+)" and insert -- (±) --, therefor.

Signed and Sealed this
Twenty-second Day of October, 2024

Katherine Kelly Vidal
*Director of the United States Patent and Trademark Office*